United States Patent [19]
Kawaura

[11] Patent Number: 5,923,901
[45] Date of Patent: Jul. 13, 1999

[54] SYSTEM FOR TRANSFERRING DATA IN PARALLEL TO HOST COMPUTER USING BOTH OF THE RISING AND FALLING EDGES OF HOST BUSY SIGNALS AS TRANSFER INSTRUCTION SIGNALS

[75] Inventor: Kimiyoshi Kawaura, Ichinomiya, Japan

[73] Assignee: Brother Kogyo Kabushiki Kaisha, Nagoya, Japan

[21] Appl. No.: 08/663,873

[22] Filed: Jun. 19, 1996

[30] Foreign Application Priority Data

Jun. 19, 1995 [JP] Japan ..................................... 7-176671

[51] Int. Cl.$^6$ .................................................... G06F 13/00
[52] U.S. Cl. ............................................ 395/873; 395/880
[58] Field of Search ............................. 358/468; 345/428, 345/509; 370/463; 395/115, 310, 873, 880

[56] References Cited

U.S. PATENT DOCUMENTS

| | | | |
|---|---|---|---|
| 5,021,892 | 6/1991 | Kita et al. ................................. | 358/468 |
| 5,065,346 | 11/1991 | Kawai et al. ............................. | 345/428 |
| 5,163,132 | 11/1992 | DuLac et al. ............................. | 395/873 |
| 5,210,749 | 5/1993 | Firoozmand .............................. | 370/463 |
| 5,349,647 | 9/1994 | Freiburg et al. .......................... | 395/115 |
| 5,396,597 | 3/1995 | Bodin et al. ............................. | 345/509 |
| 5,502,822 | 3/1996 | Takebe ..................................... | 395/310 |
| 5,671,445 | 9/1997 | Gluyas et al. ............................ | 395/873 |

*Primary Examiner*—Thomas C. Lee
*Assistant Examiner*—David Ton
*Attorney, Agent, or Firm*—Oliff & Berridge, PLC

[57] ABSTRACT

An image scanner 30 is provided with a pair of buffers 54 and 55 which have the same amount of storage area of eight bytes. Except for the first writing operation to write the first eight bytes to the first buffer 54, writing operations and transferring operations are performed simultaneously. That is, data is written into the first buffer 54 while data is retrieved from the second buffer 55, and data is written into the second buffer 55 while data is retrieved from the first buffer 54. Data is thus retrieved from the buffers 54 and 55 in alternation and transferred to the host computer 10.

23 Claims, 8 Drawing Sheets

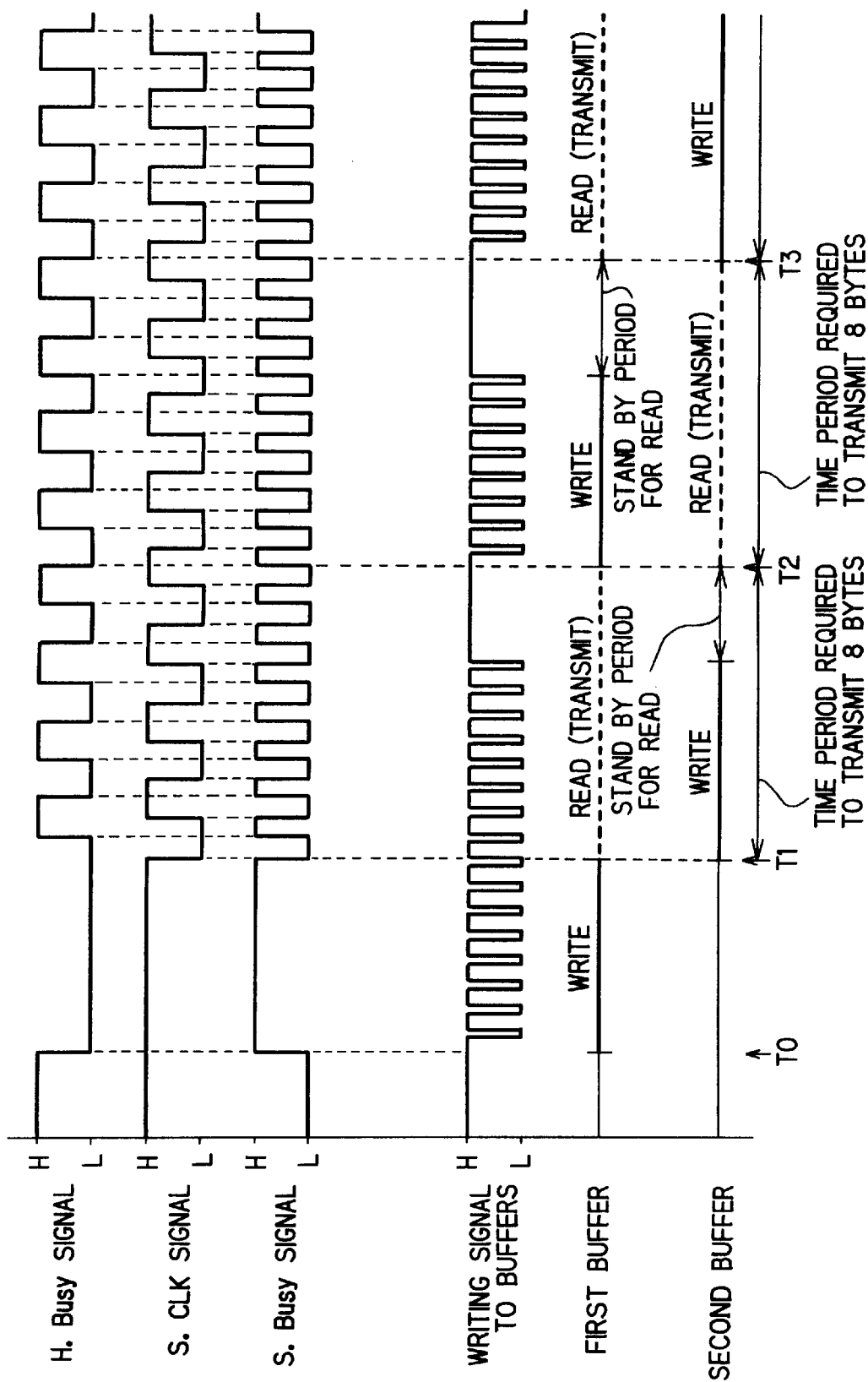

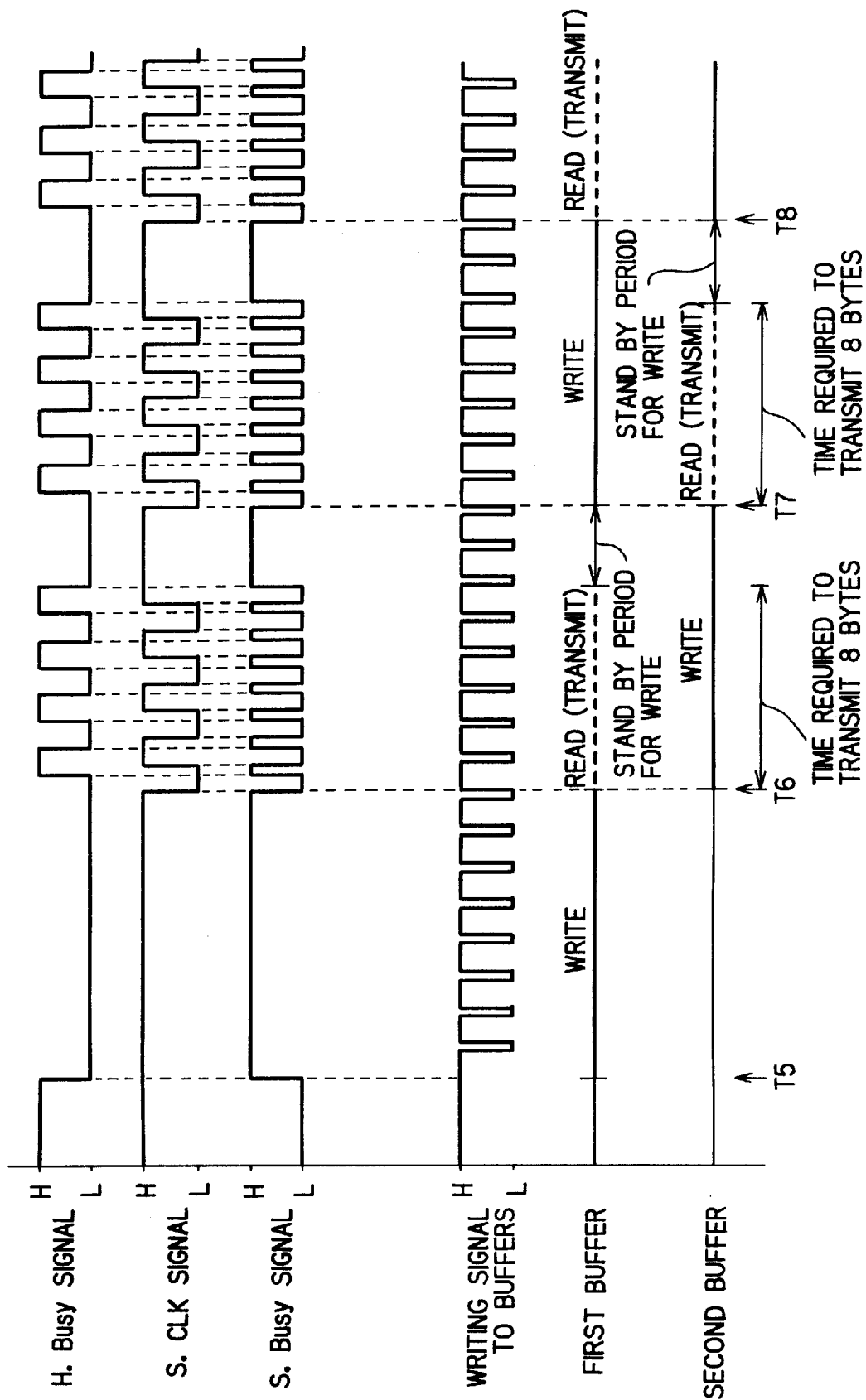

SYSTEM FOR TRANSFERRING DATA IN PARALLEL TO HOST COMPUTER USING BOTH OF THE RISING AND FALLING EDGES OF HOST BUSY SIGNALS AS TRANSFER INSTRUCTION SIGNALS

BACKGROUND OF THE INVENTION

1. Field of the Invention

The present invention relates to a parallel data transfer system for transferring data from an electronic device to a host computer via a connection cable, and relates to the electronic device employed in the parallel data transfer system.

2. Description of the Related Art

Generally, in parallel data transfer systems, an electronic device is connected to a host computer via a connection cable. In response to a transfer instruction signal transmitted from the host computer, the electronic device transfers data in parallel to the host computer.

In one example of the parallel data transfer system, an image scanner is connected via a connection cable to a host computer. The image scanner is provided with a reading mechanism for optically reading image information from an original and for producing image data. The image scanner is provided with a transmission/reception circuit which includes a Centronics communication port to which a Centronics connector is connected for connecting to the connection cable. The Centronics communication port and the Centronics connector are for transmitting and receiving parallel data to and from an external device. The image scanner can therefore transmit image data in parallel form to the host computer via the connection cable.

The host computer is constructed from a personal computer, for example. The host computer is also provided with a transmission/reception circuit which includes a Centronics communication port to which is connected a Centronics connector for connecting to the connection cable. The host computer can therefore receive the parallel image data transmitted via the connection cable from the image scanner. The host computer is constructed to be capable of transmitting the received image data to a printer device such as a laser printer. The host computer can produce image data by itself and can transmit the image data to the printer device.

There has been recently realized one type of Centronics communication system which transmits parallel data according to an IEEE1284 parallel communication interface standard. The IEEE1284 parallel communication interface is established by the Institute of Electrical and Electronics Engineers (IEEE).

SUMMARY OF THE INVENTION

It is conceivable to apply this type of Centronics communication system to the above-described parallel data transfer system in which the image scanner is connected to the host computer. According to the IEEE1284 parallel communication interface standards, image data produced at the image scanner is transferred in parallel one byte at a time to the host computer.

When the reading mechanism reads out one line of the original and produces one set of image data, the image data is temporarily stored in an image memory. In order to transfer the image data bytes one by one to the host computer, a first byte of image data is read out from the image memory and stored in a transmission buffer having a storage area for one byte. The first byte of data is immediately read out from the transmission buffer, and set in an output buffer provided to the transmission/reception circuit, from which the first byte of data is transmitted to the host computer. Then, another byte of image data is again retrieved from the image memory, stored in the transmission buffer, and set in the output buffer in the transmission/reception circuit, from which the image data is transmitted to the host computer. In this way, image data is transferred to the host computer bytes one by one.

FIG. 1 is a timing chart showing how the image scanner transfers image data to the host computer according to the IEEE1284 interface. The host computer produces a host busy signal "H.Busy" which switches between "H" and "L" levels. A lowering edge of the signal serves as a signal for instructing timing of data transfer. That is, when the host busy signal switches from a high "H" level to a low "L" level, the image scanner is instructed to start operations required to transfer one byte of image data to the host computer. It is noted that the host busy signal switches from "L" back to "H" when the host computer starts processing image data transferred from the image scanner. The image scanner produces a scanner clock signal "S.CLK" for instructing timing of data transfer. When the image scanner starts transmitting the image data via the transmission/reception circuit to the host computer, the scanner clock signal is switched from a high "H" level to a low "L" level.

As shown in FIG. 1, at a time T10 when the host busy signal switches from "H" to "L," the image scanner retrieves one byte of image data out of one line worth of image data stored in the image data memory. Then, the image scanner stores the one byte of image data in the transmission buffer. The image scanner then immediately retrieves the one byte of image data from the transmission buffer and sets the image data in the output buffer in the transmission/reception circuit. Then, at a time T11, the image scanner outputs the one byte of image data from the transmission/reception circuit to the host computer. It is noted that the drawing shows a zero-th bit of data D0 which has, for example, a high level. At the time T11, the scanner clock signal is switched from "H" to "L." Receiving the lowering edge of the scanner clock signal, the host computer starts receiving the one byte of image data transmitted from the image scanner. Then, at a time T13, the host computer starts processing the received image data. The host busy signal therefore switches from "L" to "H" at the time T13. When the host computer completes processing the image data at a time T12, the host busy signal is again switched from "H" to "L" to instruct the image scanner to transfer next one byte of image data.

In this way, the image scanner successively transmits image data bytes one by one, and the host computer successively receives the image data. This transfer manner is called a hand-shake system.

In the above-described transfer operation, however, it takes a certain duration of time t10 between the transfer-instructed time T10 and the transfer-starting time T11. During this period t10, the image scanner writes one byte of image data into the transmission buffer, retrieves the image data from the transmission buffer, and sets the image data in the output buffer in the transmission/reception circuit. For example, it takes about 10 μs to write one byte data to the transmission buffer. It takes about 20 μs to retrieve one byte of data from the transmission buffer and then to set the data in the output buffer. Accordingly, it takes about 30 μs (t10) for each one byte of image data to be transmitted. Accordingly, it takes a long period of time to transmit a large amount of image data one byte by one byte. For example, when the image scanner produces image data representative of a color image or a gray tone image, the image scanner produces several megabytes of image data. It takes a considerably long period of time to transmit several megabytes of image data one byte by one byte.

It is therefore, an object of the present invention to overcome the above-described drawbacks, and to provide an improved parallel data transfer system in which the image scanner can transfer data to the host computer at a higher rate.

In order to attain the above-described object and other objects, the present invention provides a parallel data transfer system for transferring parallel data from an electronic device to a host computer, the system comprising: a host computer for transmitting a transfer instruction signal, the host computer being capable of receiving parallel data transferred in response to the transfer instruction signal; and an electronic device for transferring a predetermined amount of parallel data to the host computer in response to the transfer instruction signal, the electronic device including: storage means for storing parallel data for being transferred to the host computer; reception means for receiving the transfer instruction signal; first and second buffers for temporarily storing parallel data read out from the storage means; writing means for reading out a predetermined amount of parallel data from the storage means and for writing the read out parallel data to either one of the first and second buffers; and transferring means for, in response to the received transfer instruction signal, retrieving the predetermined amount of parallel data from either one of the first and second buffers and transferring the retrieved parallel data to the host computer.

According to another aspect, the present invention provides a parallel data transfer system for transferring parallel data from an electronic device to a host computer, the system comprising: a host computer for transmitting a host busy signal, the host busy signal switching between a high level and a low level; and an electronic device for transferring a predetermined amount of parallel data to the host computer, the electronic device including: storage means for storing parallel data for being transferred to the host computer; reception means for receiving the host busy signal; transferring means for transferring the predetermined amount of parallel data from the storage means to the host computer at both timings when the host busy signal switches from the low level to the high level and when the host busy signal switches from the high level to the low level.

According to a further aspect, the present invention provides a parallel data transfer system for transferring parallel data from an electronic device to a host computer, the system comprising: a host computer for transmitting a transfer instruction signal, the host computer being capable of receiving parallel data transferred in response to the transfer instruction signal; and an electronic device for transferring a predetermined amount of parallel data to the host computer in response to the transfer instruction signal, the electronic device including: storage means for storing parallel data for being transferred to the host computer; reception means for receiving the transfer instruction signal; first and second buffers for temporarily storing parallel data read out from the storage means; writing means for reading out parallel data from the storage means and for writing the read out parallel data to the first and second buffers in alternation; and transferring means for, in response to the received transfer instruction signal, retrieving the predetermined amount of parallel data from either one of the first and second buffers and transferring the retrieved parallel data to the host computer.

According to still another aspect, the present invention provides an electronic device for transferring parallel data to a host computer, the device comprising: storage means for storing parallel data for being transferred to the host computer; reception means for receiving a transfer instruction signal from the host computer; first and second buffers for temporarily storing parallel data read out from the storage means; writing means for reading out a predetermined amount of parallel data from the storage means and for writing the read out parallel data to either one of the first and second buffers; and transferring means for, in response to the received transfer instruction signal, retrieving the predetermined amount of parallel data from either one of the first and second buffers and transferring the retrieved parallel data to the host computer.

According to a further aspect, the present invention provides an electronic device for transferring data in parallel to a host computer, the device comprising: storage means for storing data for being transferred to a host computer; reception means for receiving a transfer instruction signal; first and second buffers for temporarily storing data read out from the storage means; writing means for reading out data from the storage means and for writing the read out data to the first and second buffers in alternation; and transferring means for, in response to the received transfer instruction signal, retrieving data from the first and second buffers in alternation and transferring the retrieved data in parallel to the host computer.

BRIEF DESCRIPTION OF THE DRAWINGS

The above and other objects, features and advantages of the invention will become more apparent from reading the following description of the preferred embodiment taken in connection with the accompanying drawings in which:

FIG. 8 is a timing chart of control signals and image data transferred according to the present embodiment where a data writing speed is higher than a data retrieving speed; and FIG. 9 is a timing chart of control signals and image data transferred according to the present embodiment where a data writing speed is lower than a data retrieving speed.

DETAILED DESCRIPTION OF THE PREFERRED EMBODIMENTS

Figure 1:
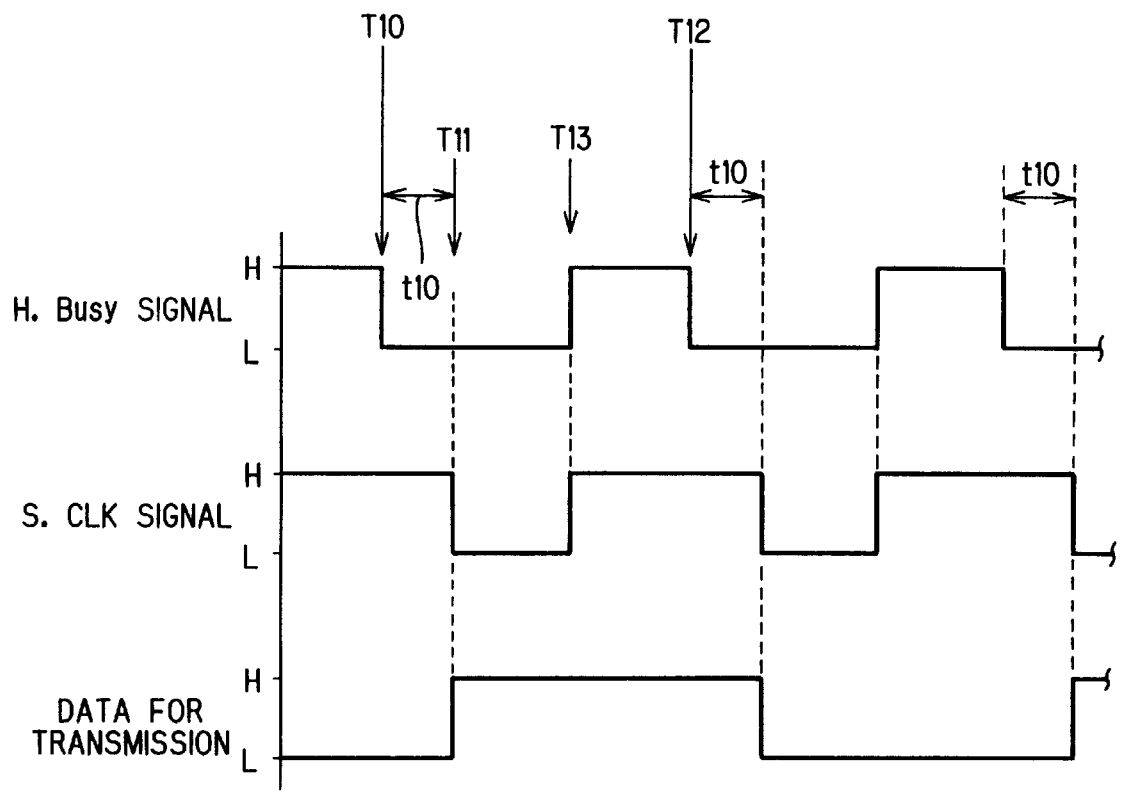
FIG. 1 is a timing chart of control signals and image data transferred according to a conceivable image transfer system.

A parallel data transfer system according to a preferred embodiment of the present invention will be described while referring to the accompanying drawings wherein like parts and components are designated by the same reference numerals to avoid duplicating description.

Figure 2:
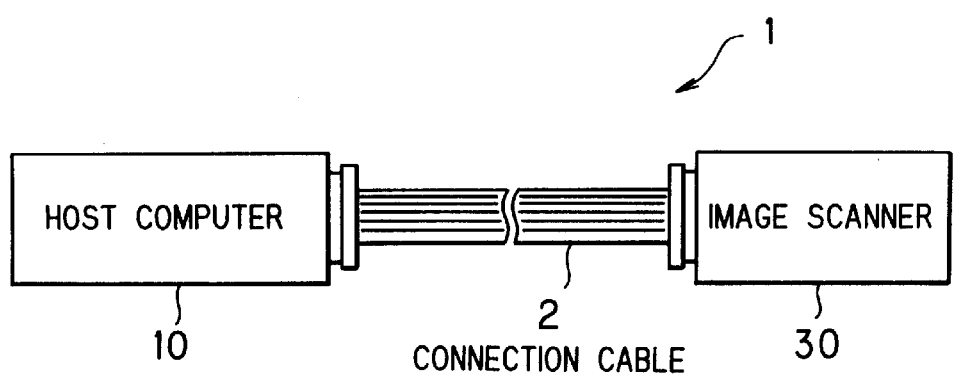
FIG. 2 is a schematic view of an image transfer system of an embodiment of the present invention.

FIG. 2 shows an image data transfer system 1 of the present embodiment. In the image data transfer system 1, a host computer 10 is connected with an image scanner 30 via a connection cable 2. The image scanner 30 is for reading out an image from an original and for producing image data. The image data transfer system 1 is for transferring image data in parallel from the image scanner 30 to the host computer 10 according to IEEE1284 communication interface standards.

Figure 4:
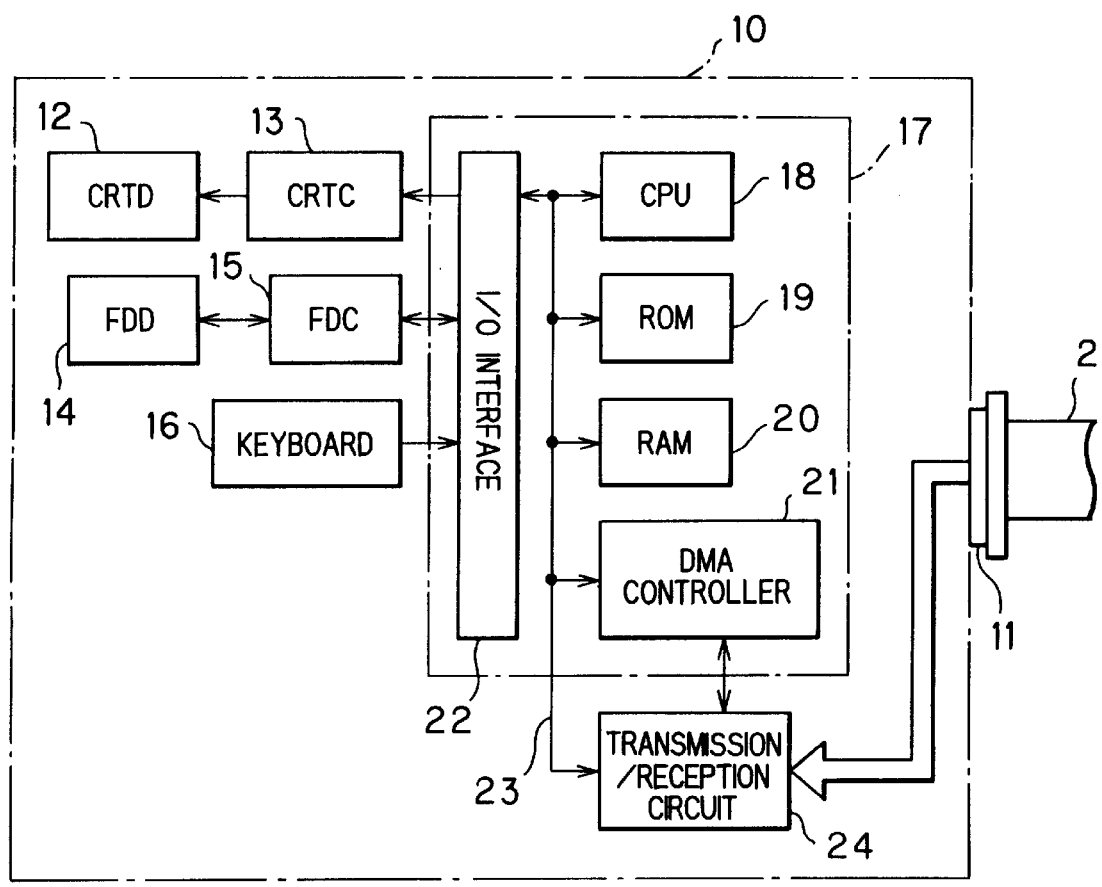
FIG. 4 is a block diagram of a control system of a host computer employed in the system of FIG. 2.

FIG. 4 is a block diagram of a control system provided in the host computer 10.

The host computer 10 includes a control device 17. In the control device 17, a central processing unit (CPU) 18 is connected via a control bus 23 to: an input/output interface 22, a read-only memory (ROM) 19, a random-access memory (RAM) 20, and a DMA (direct memory access) controller 21. The control bus 23 is constructed from an 8-bit data bus. The ROM 19 stores therein various data processing programs and a control program for transmitting and receiving image data in parallel according to IEEE1284 communication interface standards. The RAM 20 is formed with several memories for storing data obtained during various data processing operations. The DMA controller 21 is for transferring data at a high rate without being controlled by the CPU 18.

The CPU 17 is further connected via the control bus 23 to a transmission/reception circuit 24. The transmission/reception circuit 24 is provided with a Centronics communication port which is capable of transmitting and receiving parallel image data to and from the image scanner 30 according to IEEE1284 communication interface standards. The transmission/reception circuit 24 is connected with a Centronics connector 11 which is in turn connected to the image scanner 30 via the connection cable 2.

The input/output interface 22 is connected to: a CRT controller (CRTC) 13 for outputting character data and symbol data to a CRT display (CRTD) 12; a floppy disk controller 15 for controlling a floppy disk drive (FDD) 14; and a keyboard 16.

Figure 3:
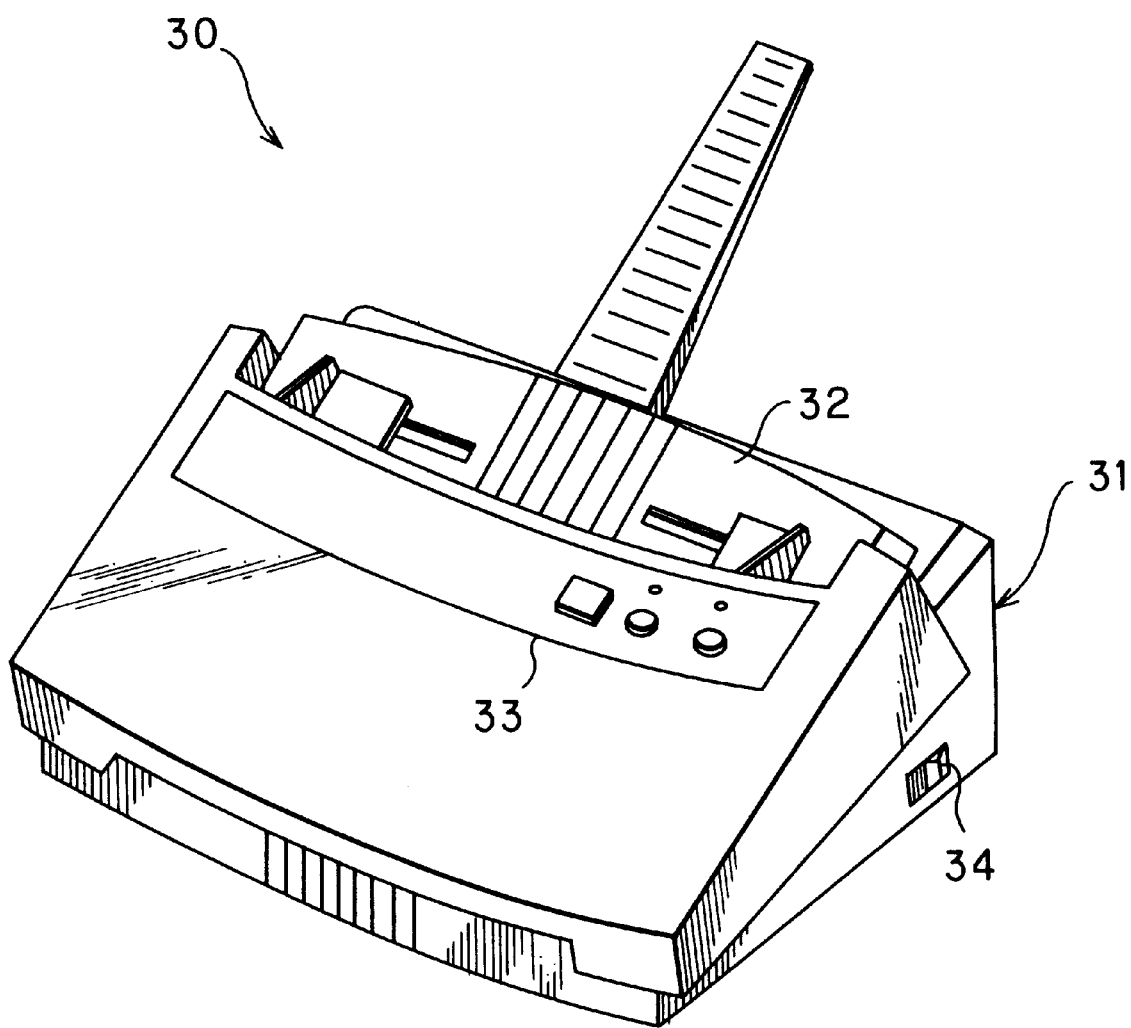
FIG. 3 is a perspective view of an image scanner employed in the system of FIG. 2.

FIG. 3 is an external perspective view of the image scanner 30. The image scanner 30 includes a paper holder 32 for supporting a stack of originals. An original transporting mechanism (not shown) is housed in a frame 31. With the original transporting mechanism, the lowermost original stacked in the paper holder 32 is fed inside the image scanner 30, transported along a predetermined original transportation path, and then discharged out of the image scanner 30. An image sensor 40 (see FIG. 5) is disposed in the original transportation path for reading an image from the original. The image sensor 40 is made up of a plurality of CCDs (charge coupled devices) aligned in a direction traversing the original transportation path.

A power switch 34 is provided in the side frame, and an operation panel 33 is provided in the upper frame. Operation switches including a copy switch are provided in the operation panel 33.

Figure 5:
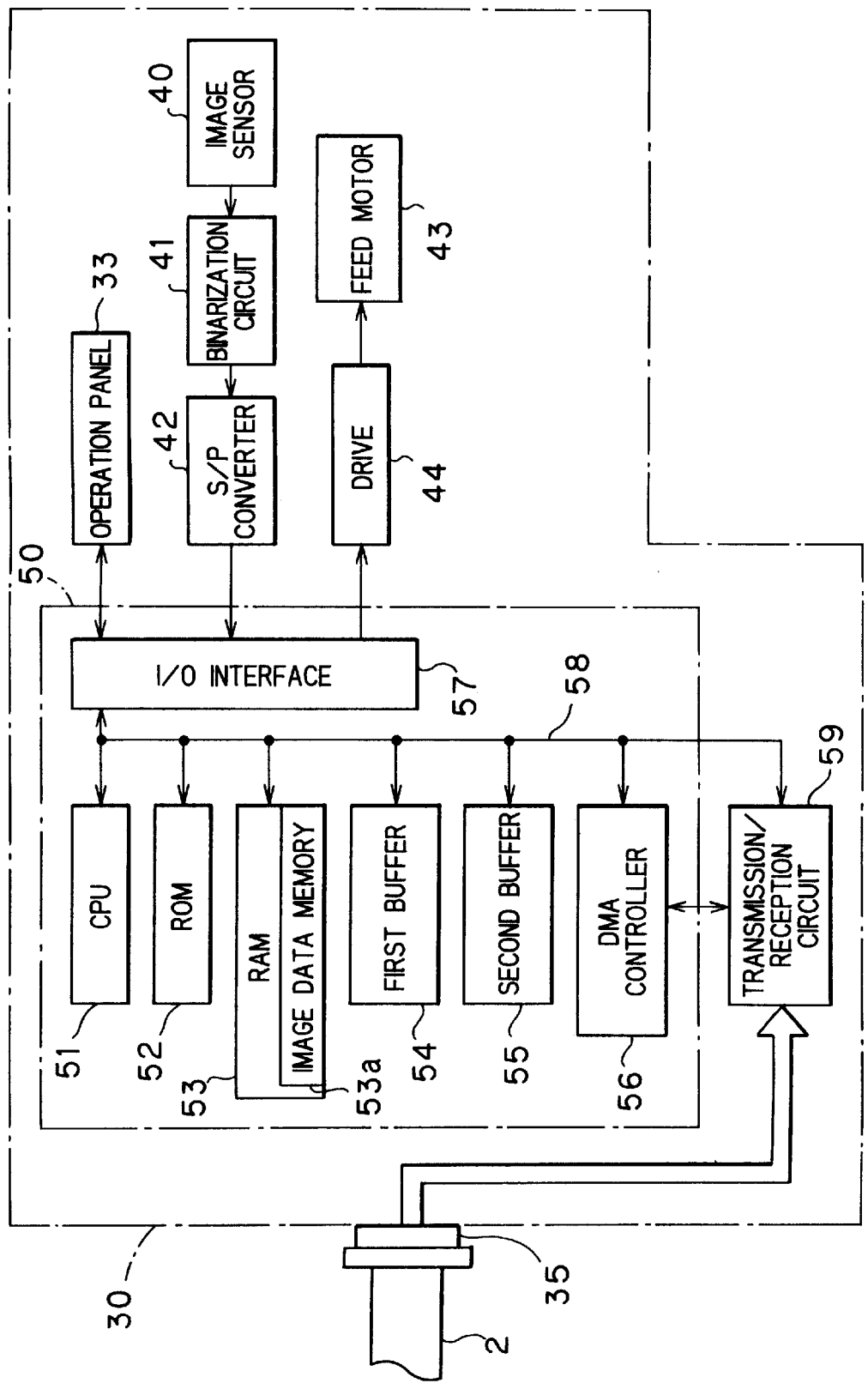
FIG. 5 is a block diagram of a control system of the image scanner employed in the system of FIG. 2.

The image scanner 30 incorporates a control system as shown in block form in FIG. 5. The image scanner 30 includes a control unit 50, in which a CPU (central processing unit) 51 is connected via a control bus 58 to: an input/output interface 57, a ROM (read-only memory) 52, a RAM (random access memory) 53, a first transmission buffer 54, a second transmission buffer 55, and a DMA (direct memory access) controller 56.

The CPU 51 is further connected via the control bus 58 to a transmission/reception circuit 59. The transmission/reception circuit 59 is provided with a Centronics communication port which is capable of transmitting and receiving image data to and from the host computer 10 according to IEEE1284 communication interface standards. The transmission/reception circuit 59 is connected with a Centronics connector 35 which is in turn connected to the host computer 10 via the connection cable 2.

To the input/output interface 57 are connected: an S/P (serial-to-parallel) converter 42, the switches on the control panel 33, a driver circuit 44, a light source (not shown) for illuminating the original, a cover open detection switch (not shown) and the like. The S/P converter 42 is connected via a binarization circuit 41 to the image sensor 40. When the image sensor 40 reads out the original and produces serial analog image data, the binary circuit 41 digitalizes the serial analog image data into digital data, and the S/P converter 42 converts the serial image data into parallel image data. The driver 44 is for driving an original feed motor 43 which is a drive source of the original transportation mechanism.

The RAM 53 is formed with an image data memory 53a for storing one line worth of image data read out by the image sensor 40. The RAM 53 is also formed with other various memories used for reading out image data from the original. The first and second buffers 54 and 55 are constructed to be capable of storing the same amount of, for example, eight bytes of, image data. For example, each of the buffers 54 and 55 is constructed from a FIFO memory (first-in-and-first-out memory) having eight (8) bytes' worth of storage area. Each of the buffers 54 and 55 has eight addresses each for storing one byte of image data. The buffers 54 and 55 are for alternately storing eight bytes of image data retrieved from the image data memory 53a.

The DMA (direct memory access) controller 56 is for transferring data at a high rate without being controlled by the CPU 51. The DMA controller 56 is an interface circuit for the special hardware required for direct transfer of data between a memory and another device. In the DMA controller, data is not subjected to a program-controlled transfer operation performed by the CPU, but is directly transferred between the memory and the device. The DMA controller can therefore transfer data at a high speed data. In the present embodiment, the DMA controller 56 is connected to: the first transmission buffer 54, the second transmission buffer 55, and the transmission/reception circuit 59. The CPU 51 controls the DMA controller 56 to perform direct transfer operation between the buffers 54 and 55 and the transmission/reception circuit 59. According to the present invention, the DMA controller 56 retrieves one byte of image data from one of the buffers 54 and 55 and transfers the image data to the transmission/reception circuit 59. After the DMA controller 56 retrieves 8 bytes of data in total from one of the buffers 54 and 55, the DMA controller 56 then starts retrieving 8 bytes of data from the other one of the buffers 54 and 55. Thus, the DMA controller 56 retrieves 8 bytes of data from the buffers 54 and 55 in alternation.

The DMA controller 56 is formed with several registers, such as a read buffer pointer and a read address pointer. The read buffer pointer is switchingly set with data indicative of the buffers 54 and 55. The read buffer pointer is used for retrieving 8 bytes of image data from the buffers 54 and 55 in alternation. The read address pointer is incremented at every rising edge and every lowering edge of the host busy signal. The read address pointer is used for retrieving image data bytes one by one from the buffers 54 and 55. The DMA controller 56 is also formed with a controller control portion.

The ROM 52 stores therein various data processing programs and a control program for transmitting and receiving image data in parallel according to the IEEE1284 communication interface standard.

With the above-described structure of the system 1, image data is transmitted bytes one by one from the image scanner 30 to the host computer 10 according to IEEE1284 communication interface standards.

In order to perform this transmission operation, the host computer 10 produces various control signals: a host clock signal "H.CLK", a host busy signal "H.Busy", and the like. The host clock signal is for instructing transfer timing of command data. The host busy signal is for instructing timing when image data is desired to be transferred. According to the present embodiment, the host computer switches the host busy signal between "H" and "L" to cause the image scanner 30 to transfer image data to the host computer. Accordingly, both rising edges and lowering edges of the host busy signal serve as a transfer instruction signal. According to the present embodiment, the host computer does not switch the host busy signal when the host computer starts processing image data transmitted from the image scanner.

The image scanner 30 also produces various control signals: a scanner clock signal "S.CLK", a scanner busy signal "S.Busy", and the like. The scanner clock signal is for instructing timing when data is transferred to the host computer. That is, the scanner clock signal switches between "H" and "L" every time the image scanner 30 starts transferring one byte of image transfer data. The scanner busy signal is for instructing that the image scanner 30 is in a busy condition. In more concrete terms, the scanner busy signal is in a high "H" level from when the image scanner 30 receives the transmission instruction signal (i.e., rising/lowering edge of the host busy signal) until the image scanner 30 starts transmitting image transfer data.

Figure 6:
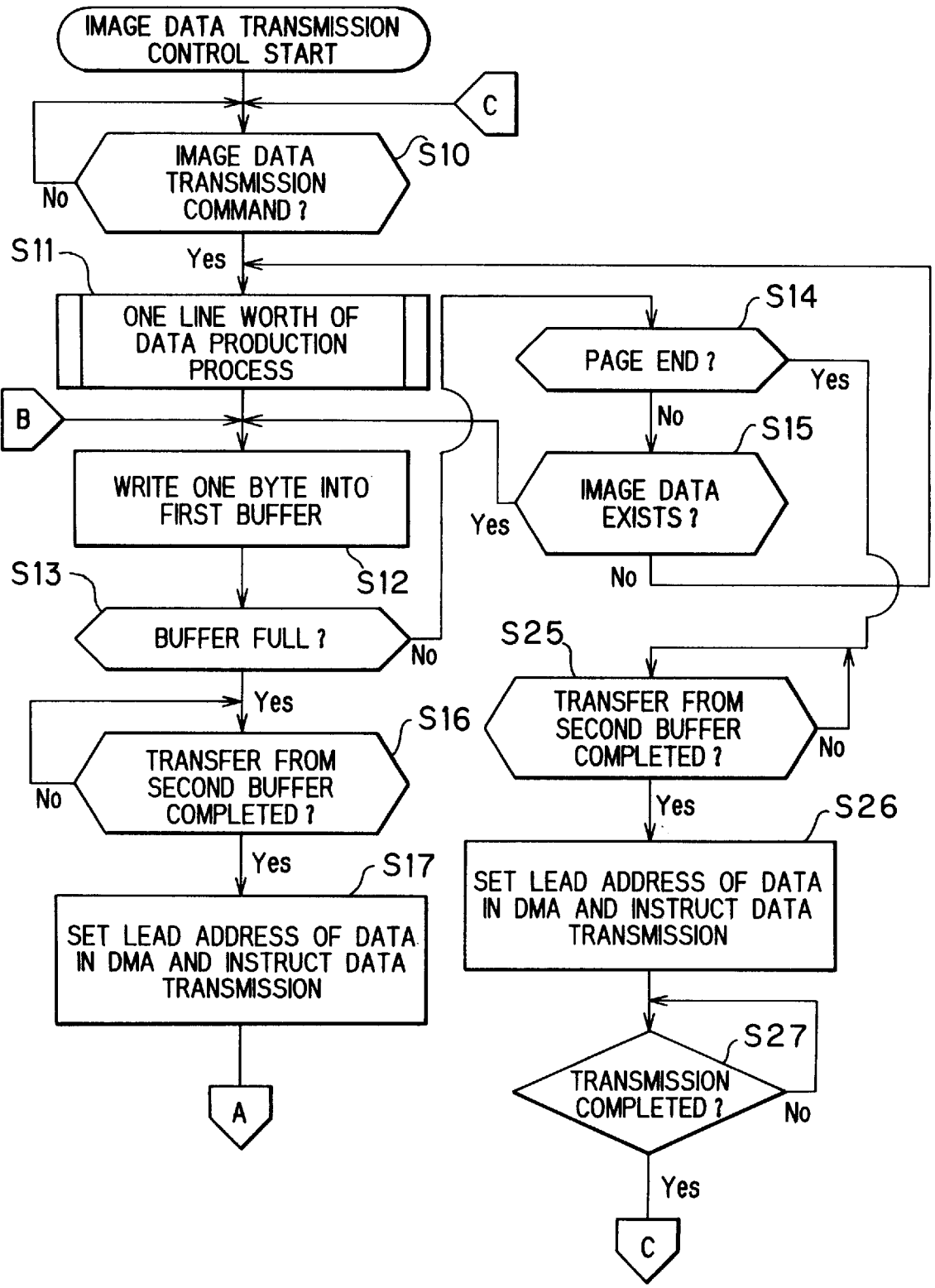
FIG. 6 is a part of a flowchart of an image data transfer control operation.
Figure 7:
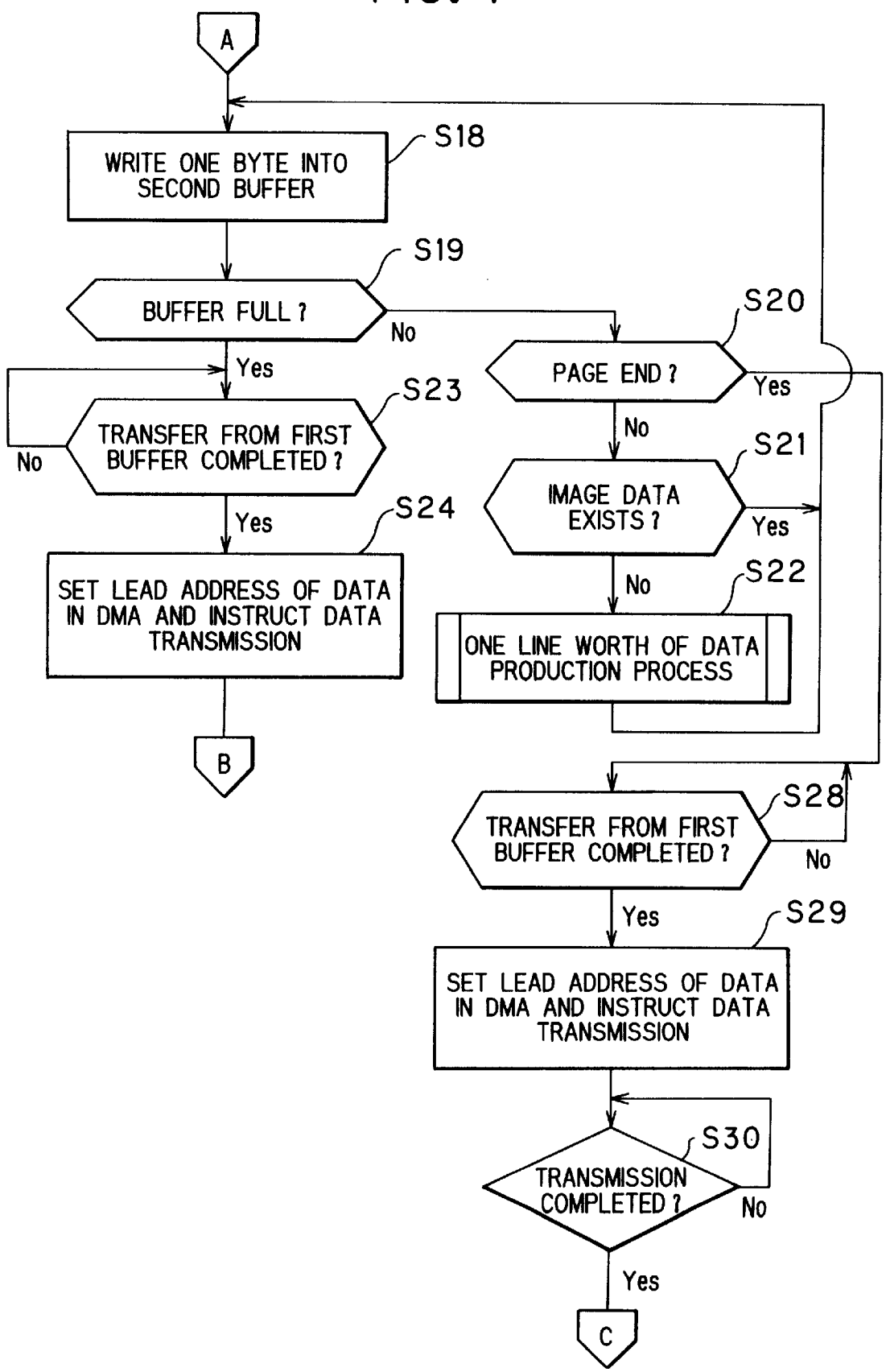
FIG. 7 is a remaining part of the flowchart of the image data transfer control operation.

With the above-described structure, the control device 50 in the image scanner 30 performs an image data transfer control operation shown in FIGS. 6 and 7. Individual steps in the flowcharts of these drawings will be represented as Si, wherein i is the number of the step (i.e., i=11, 13, 15, ... i).

When the power switch 34 is turned on, several initialization steps are performed. Then, the image data transmission control operation shown in FIGS. 6 and 7 is started. First, in an idling state, the CPU 51 repeatedly judges in S10 whether or not an image data transmission command is received from the host computer 10. When the transmission command is received ("Yes" in S10), the CPU 51 starts an image reading operation in S11 to produce one line's worth of image data to be transferred to the host computer 10. In this step S11, the driving circuit 44 controls the motor 43 to feed the original along the original transportation path by a distance of one line. The image sensor 40 then produces one line's worth of image data based on the image of the original. The one set of image data is converted into binary data in the binary circuit 41, and converted into parallel image data in the S/P circuit 42. Header data is then added to the one set of parallel data, and the resultant data is stored in the image data memory 53*a* as image transfer data to be transferred to the host computer 10.

Then, in S12, a first one byte of data is retrieved from the one set of image transfer data stored in the memory 53*a*, and is written into the first transmission buffer 54. It is judged in S13 whether or not the first buffer 54 is in a buffer full condition. When the first buffer 54 is not yet in the buffer full condition ("No" in S13), it is further judged in S14 whether or not the one byte of data presently being written in the first buffer 54 is a page end code that indicates an end portion of one page of the original. If that one byte of data is not a page end code ("No" in S14), it is further judged in S15 whether or not any image transfer data remains in the memory 53*a*.

As long as some image transfer data exists in the memory 53*a* ("Yes" in S15), the steps S12–S15 are repeatedly performed.

When all the image transfer data in the memory 53*a* is transferred to the first buffer 54 ("No" in S15), another set of image transfer data representative of the next line is produced and stored in the memory 53*a* in S11.

When the first buffer 54 is written with 8 bytes of image transfer data and so becomes full ("Yes" in S13), it is judged in S16 whether or not all the image transfer data has been retrieved from the second transmission buffer 55 and transferred to the host computer 10. This judgement is attained based on a DMA complete signal produced by the DMA controller 56 which counts terminal of the data transfer. If the data transfer from the second buffer 55 is not yet completed ("No" in S16), the CPU 51 waits until the data transfer is completed.

When the data transfer from the second buffer 55 is completed ("Yes" in S16), the program proceeds to S17. In S17, data indicative of the first buffer 54 is set in the read buffer pointer of the DMA controller 56, and a lead address "0" of the first buffer 54 is set in the read address pointer. Then, the DMA controller 56 is instructed by the CPU 51 to transfer data from the first buffer 54 to the host computer 10. Receiving the instruction, the DMA controller 56 starts incrementing, from zero, the read address pointer one by one at each timing when the host busy signal switches from "H" to "L" and from "L" to "H." Accordingly, image transfer data stored at an address indicated by the present read address pointer is outputted to an output buffer provided to the transmission/reception circuit 59, from which the image transfer data is transmitted to the host computer 10. Thus, image transfer data stored in the first buffer 54 will be transmitted bytes one by one to the host computer 10. During this transfer operation, a next set of image transfer data of 8 bytes is retrieved from the memory 53*a* and written into the second buffer 55 in the following manner.

First, in S18, the CPU 51 retrieves, from the memory 53*a*, another one byte of image transfer data stored in the memory 53*a* next to the image transfer data written into the first buffer 54 in the most recently performed S12. While the second buffer 55 is not full ("No" in S19), if the data now written in the second buffer 55 is not a page end code ("No" in S20) and if any image transfer data remains in the memory 53*a* ("Yes" in S21), S18 through S21 are repeatedly conducted. When all the image data in the memory 53 is retrieved and written in the second buffer 55 ("No" in S21), another set of image transfer data is produced in S22 for the next line of the original. Then, the program returns to S18.

When the second buffer 55 is written with 8 bytes of image transfer data and becomes full ("Yes" in S19), it is judged in S23 whether or not all the image transfer data has been retrieved from the first transmission buffer 54 and transferred to the host computer 10. This judgement is performed also based on a DMA complete signal produced by the DMA controller 56. If the data transfer from the first buffer 54 is not yet completed ("No" in S23), the CPU 51 waits until the data transfer is completed. When the data transfer from the first buffer 54 is completed ("Yes" in S23), the program proceeds to S24.

In S24, the read buffer pointer of the DMA controller 56 is set with data indicative of the second buffer 55, and the read address pointer is set to a lead address "0" of the second buffer 55. The DMA controller 56 is instructed from the CPU 51 to transfer data from the second buffer 55 bytes one by one to the host computer 10. Then, the program proceeds to S12.

In the step S24, when receiving instruction from the CPU 51, starting from zero, the DMA controller 56 increments the read address pointer one by one each time the host busy signal switches between "H" and "L." Image transfer data will be transmitted bytes one by one from the second buffer 55 via the circuit 59 to the host computer 10. During this transfer operation, a next set of image data of 8 bytes is retrieved from the memory 53a and stored into the first buffer 54 in S11 through S15.

It is noted that when data being presently written in the first buffer 54 is a page end code ("Yes" in S14), the program proceeds to S25 where it is judged whether or not data transfer from the second buffer 55 is completed. If the data transfer is not yet completed ("No" in S25), the CPU 51 waits until the data transfer is completed. When the data transfer is completed ("Yes" in S25), the program proceeds to S26 where the read buffer pointer of the DMA controller 56 is set with data indicative of the first buffer 54 and the read address pointer is set to a lead address of the first buffer 54. Then, the DMA controller 56 transfers data from the first buffer 54 bytes one by one to the host computer 10. When the transmission is completed, the program returns to S10 to wait a next image data transmission command.

Similarly, when data being presently written in the second buffer 55 is a page end code ("Yes" in S20), the program proceeds to S28 where it is judged whether or not data transfer from the first buffer 54 is completed. If the data transfer is not yet completed ("No" in S28), the CPU 51 waits until the data transfer is completed. When the data transfer is completed ("Yes" in S28), the program proceeds to S29 where the read buffer pointer of the DMA controller 56 is set with data indicative of the second buffer 55, and the read address pointer is set to a lead address of the second buffer 55. Then, the DMA controller 56 transfers data from the second buffer 55 bytes one by one to the host computer 10. When the transmission is completed, the program returns to S10 to wait a next image data transmission command.

FIG. 8 is a timing chart showing how image transfer data is written into the buffers 54 and 55 and transferred from the buffers to the host computer 10. As apparent from the figure, every rising edge and every lowering edge of the host busy signal 10 serves as a transmission instruction signal to start the scanner to transfer data. The scanner clock signal switches between "H" and "L" every time the image scanner 30 starts transfer of one byte of image transfer data. The scanner busy signal is in a high "H" level from when the image scanner 30 receives the transmission instruction signal (i.e., rising/lowering edge of the host busy signal) until the image scanner 30 starts transmitting image transfer data (i.e., rising/lowering edge of the scanner clock signal.)

In this example, a data writing speed, at which data is written into the buffers 54 and 55, is slightly faster than a data retrieving speed, at which data is retrieved from the buffers 54 and 55 and transferred to the host computer 10. At the time T0 when the host busy signal first switches into "L," the CPU 51 starts writing eight bytes of image data into the first buffer 54. The writing operation is completed at the time T1. At the time T1, the DMA controller 56 starts retrieving the image data bytes one by one from the first buffer 54 and transferring the retrieved image data to the host computer 10. At the same time T1, the CPU 51 starts writing eight bytes of image data to the second transmission buffer 55. When the time reaches the time T2, the DMA controller 56 completes transferring eight bytes of image data from the first buffer 54 to the host computer 10.

It is noted that since the writing speed is faster than the retrieving speed, the operation for writing into the second buffer 55 is completed before the operation for retrieving from the first buffer 54. After completion of the writing operation, therefore, the second transmission buffer 55 is brought into a standby condition until the retrieving operation from the first buffer 54 is completed.

At the time T2, the DMA controller 56 starts transferring image data from the second buffer 55 to the host computer 10. Simultaneously, the CPU 51 starts writing eight bytes of image data to the first buffer 54.

It is therefore apparent that the transferring processes are continuously performed except for the first writing period from T0 to T1. During the first transferring period from T1 to T2, image data is transferred from the first transmission buffer 54. During the second transferring period from T2 to T3, image data is transferred from the second transmission buffer 55. Thus, image data is continuously transferred from the buffers 54 and 55 in alternation. No writing periods are added between the successive transferring periods. Accordingly, it is possible to increase the entire data transmission speed merely by increasing the data retrieving speed.

FIG. 9 is a timing chart for another example where the data writing speed is slightly slower than the data retrieving speed.

In this example, at the time T5 when the host busy signal first switches into "L," the CPU 51 starts writing image data into the first buffer 54. The writing operation is completed at the time T6. At that time, the DMA controller 56 starts transferring, to the host computer 10, image data now stored in the first buffer 54. At the same time, the CPU 51 starts writing image data into the second transmission buffer 55. When the time reaches the time T7, the CPU 51 completes writing image data to the second buffer 55.

It is noted that since the retrieving speed is faster than the writing speed, the operation for retrieving from the first buffer 54 is completed before the operation for writing into the second buffer 55. After completion of the transfer operation, therefore, the first transmission buffer 54 is brought into a standby condition until the writing operation to the second buffer 55 is completed.

At the time T7, the DMA controller 56 starts transferring image data from the second buffer 55 to the host computer 10. Simultaneously, the CPU 51 starts writing the next eight bytes of image data into the first buffer 54.

Thus, according to this example, writing processes are continuously performed. During the first writing period from T5 to T6, data is written into the first transmission buffer 54. During the second writing period from T6 to T7, data is written into the second transmission buffer 55. Thus, image data is continuously written into the buffers 54 and 55 in alternation. No transferring periods are added between the successive writing periods. Accordingly, it is possible to increase the entire data transmission speed merely by increasing the data writing speed.

It is noted that when the data writing speed is exactly the same as the data transferring speed, both the writing operations and the transferring operations are continuously performed without no standby periods.

According to the present embodiment, every time the host busy signal switches between "H" and "L", the address set in the read address pointer is incremented, whereby one byte of data stored at the address is simply outputted to the output buffer in the transmission/reception circuit 59, from which the data is transferred to the host computer 10. Accordingly, time duration required to transfer each one byte of data becomes much shorter than the time duration t10 described with reference to FIG. 1.

As described above, according to the present embodiment, the image scanner 30 is provided with the pair of buffers 54 and 55 which have the same amount of storage area of eight bytes. Except for the first writing operation to write the first eight bytes to the first buffer 54, writing operations and transferring operations are performed simultaneously. That is, data is written into the first buffer 54 while data is retrieved from the second buffer 55, and data is written into the second buffer 55 while data is retrieved from the first buffer 54. Data is thus retrieved from the buffers 54 and 55 in alternation and transferred to the host computer 10.

Additionally, the host computer 10 controls the host busy signal to switch between high and low levels when desiring to instruct data transfer. The host computer 10 does not switch the host busy signal when the host computer starts processing received image data. Because the processings in the host computer are thus simplified, the host computer can process the received data in a shorter period of time. It becomes possible to shorten the interval, at which the host computer 10 instructs data transfer.

Because both the rising edges and the lowering edges of the host busy signal serve as transfer instruction signals, the image scanner 30 may simply detect change in the host busy signal. The image scanner 30 can therefore start its transfer operation within a shorter period of time.

While the invention has been described in detail with reference to the specific embodiment thereof, it would be apparent to those skilled in the art that various changes and modifications may be made therein without departing from the spirit of the invention.

For example, the first and second buffers 54 and 55 are not limited to have the storage areas of eight bytes. The buffers 54 and 55 may have the storage areas of at least one byte as long as they have the same amount of storage areas.

In the above-described embodiment, image data is transferred to the host computer 10 at both every rising edge and every lowering edge of the host busy signal. However, image data may be transferred to the host computer 10 at either one of every rising edge and every lowering edge.

As described above, the parallel data transfer system of the present invention is for transferring parallel data from an electronic device to a host computer. The host computer transmits to the electronic device a transfer instruction signal. The electronic device transmits a predetermined amount of parallel data to the host computer every time the electronic device receives the transfer instruction signal. The host computer receives parallel data transmitted from the electronic device.

In the electronic device, the parallel data is stored in a memory. The electronic device is further provided with a pair of buffers each for temporarily storing parallel data read out from the memory. Data is read out from the memory by a predetermined amount and then written into either one of the pair of buffers. In response to the transfer instruction signal, the predetermined amount of data is retrieved from the buffer, and transferred in parallel to the host computer. According to the present invention, data is retrieved from the memory and is written into one of the buffers while the data is retrieved from the other one of the buffers and transferred to the host computer.

Thus, a data transferring process from one of the buffers is performed while a data writing process into the other one of the buffers is performed. Accordingly, entire data can be transmitted to the host computer within a short period of time.

When the retrieving and transferring process is conducted with the DMA controller, because the process is performed according to a hardware process and no control programs are necessary, the data transfer speed can be greatly enhanced.

Especially, the electronic device may be constructed as an image scanner, and the host computer may be constructed to produce a host busy signal which switches between a high level and a low level. The predetermined amount of data may be retrieved from the buffers at both timings when the host busy signal switches from the low level to the high level and when the host busy signal switches from the high level to the low level. Accordingly, even when data is transmitted according to a general type of Centronics communication manner, data can be transmitted to the host computer in response to both the lowering edges and the rising edges of the host busy signal. Accordingly, the image reading speed and the image transferring speed can be increased.

The pair of buffers are preferably constructed to be capable of storing the same amount of data equal to or greater than one byte. Accordingly, when the data writing speed is substantially equal to the data retrieving speed, data can be written to and retrieved from both the pair of buffers continuously. Accordingly, it is possible to transfer entire data at a high rate through merely improving the data writing speed and the data retrieving speed.

Additionally, data can be transferred to the host computer not only in response to the lowering edge of the host busy signal but also in response to the rising edge of the host busy signal. Because data is transferred in response to both the lowering edges and the rising edges of the host busy signal, entire data can be transferred to the host computer within a short period of time even though the entire data has a large amount of data.

What is claimed is:

1. A parallel data transfer system for transferring parallel data from an electronic device to a host computer, the system comprising:

a host computer for transmitting a host busy signal, the host busy signal switching between a high level and a low level, the host computer being capable of receiving parallel data transferred in response to the host busy signal; and an electronic device for transferring parallel data to the host computer in response to the host busy signal, the electronic device including:

storage means for storing parallel data for being transferred to the host computer;

reception means for receiving the host busy signal;

first and second buffers for temporarily storing parallel data read out from the storage means;

writing means for reading out a predetermined amount of parallel data from the storage means and for writing the read out parallel data to either one of the first and second buffers; and transferring means for retrieving the predetermined amount of parallel data from either one of the first and second buffers and transferring the retrieved parallel data to the host computer, the transferring means retrieving at least a part of the predetermined amount of parallel data and transferring the retrieved parallel data at a timing when the host busy signal switches from each of the high level and the low level to the other one of the high level and the low level.

2. A parallel data transfer system of claim 1, further comprising control means for controlling the writing means to write the predetermined amount of parallel data read out from the storage means into one of the first and second buffers while controlling the transferring means to retrieve the predetermined amount of parallel data from the other one of the first and second buffers and transfer the parallel data to the host computer.

3. A parallel data transfer system of claim 1, wherein the control means includes selecting means for alternately selecting one of the first and second buffers as a buffer, into which the writing means writes the parallel data.

4. A parallel data transfer system of claim 3, wherein the write means successively and continuously writes the parallel data read out from the storage means into the first and second buffers in alternation.

5. A parallel data transfer system of claim 4, wherein the selecting means selects the first buffer when the second buffer is brought into a buffer full condition, and wherein the selecting means selects the second buffer when the first buffer is brought into a buffer full condition.

6. A parallel data transfer system of claim 3, wherein the control means controls the transferring means to successively and continuously retrieve the predetermined amount of parallel data from the first and second buffers in alternation and transfers the parallel data to the host computer.

7. A parallel data transfer system of claim 6,
wherein the selecting means alternately selects one of the first and second buffers as a buffer, from which the transferring means retrieves the predetermined amount of parallel data, and wherein the selecting means selects the second buffer when all the predetermined amount of parallel data stored in the first buffer is completely transferred to the host computer, and wherein the selecting means selects the first buffer when all the predetermined amount of parallel data stored in the second buffer is completely transferred to the host computer.

8. A parallel data transfer system of claim 1, wherein the first and second buffers are capable of storing the same amount of parallel data.

9. A parallel data transfer system of claim 8, wherein both the first and second buffers are capable of storing the predetermined amount of data.

10. A parallel data transfer system of claim 9, wherein the first and second buffers are capable of storing the same predetermined amount of data which is equal to or greater than one byte; and
wherein the transferring means successively retrieves and transfers the parallel data bytes one by one at successive timings when the host busy signal switches from each of the high level and the low level to the other one of the high level and the low level.

11. A parallel data transfer system of claim 1, wherein the transferring means includes:
a parallel data transmission circuit capable of transmitting the predetermined amount of parallel data to the host computer; and
a direct memory access controller for transferring the predetermined amount of parallel data from either one of the first and second buffers to the parallel data transmission circuit according to a direct memory access transfer manner.

12. A parallel data transfer system of claim 1, wherein the electronic device further includes image scanning means for reading out the parallel data from an original, the parallel data being stored in the storage means.

13. A parallel data transfer system for transferring parallel data from an electronic device to a host computer, the system comprising:
a host computer for transmitting a host busy signal, the host busy signal switching between a high level and a low level; and
an electronic device for transferring a first predetermined amount of parallel data to the host computer, the electronic device including:
storage means for storing parallel data for being transferred to the host computer;
reception means for receiving the host busy signal;
transferring means for transferring the first predetermined amount of parallel data from the storage means to the host computer at both timings when the host busy signal switches from the low level to the high level and when the host busy signal switches from the high level to the low level.

14. A parallel data transfer system of claim 13, further comprising:
first and second buffers for temporarily storing parallel data read out from the storage means; and
writing means for reading out a second predetermined amount of parallel data from the storage means and for writing the read out parallel data to either one of the first and second buffers, the second predetermined amount being equal to or greater than the first predetermined amount;
wherein the transferring means retrieves the second predetermined amount of parallel data from either one of the first and second buffers and transfers the retrieved parallel data to the host computer, the transferring means successively retrieves the first predetermined amount of parallel data out of the second predetermined amount of parallel data and transfers the retrieved parallel data at both timings when the host busy signal switches from the low level to the high level and when the host busy signal switches from the high level to the low level.

15. A parallel data transfer system of claim 14, further comprising control means for controlling the writing means to write the second predetermined amount of parallel data read out from the storage means into one of the first and second buffers while controlling the transferring means to retrieve the second predetermined amount of parallel data from the other one of the first and second buffers and transfer the parallel data to the host computer.

16. A parallel data transfer system of claim 15, wherein the control means includes selecting means for alternately selecting one of the first and second buffers as a buffer, into which the writing means writes the parallel data and for alternately selecting one of the first and second buffers as a buffer, from which the transferring means retrieves the parallel data.

17. A parallel data transfer system for transferring parallel data from an electronic device to a host computer, the system comprising:
a host computer for transmitting a host busy signal, the host busy signal switching between a high level and a low level, the host computer being capable of receiving parallel data transferred in response to the host busy signal; and
an electronic device for transferring parallel data to the host computer in response to the host busy signal, the electronic device including:
storage means for storing parallel data for being transferred to the host computer;
reception means for receiving the host busy signal;
first and second buffers for temporarily storing parallel data read out from the storage means;

writing means for reading out parallel data from the storage means and for writing the read out parallel data to the first and second buffers in alternation; and transferring means for retrieving parallel data from either one of the first and second buffers and transferring the retrieved parallel data to the host computer at both timings when the host busy signal switches from the low level to the high level and when the host busy signal switches from the high level to the low level.

18. A parallel data transfer system of claim 17, further comprising control means for controlling the writing means to write parallel data read out from the storage means into one of the first and second buffers while controlling the transferring means to retrieve parallel data from the other one of the first and second buffers and transfer the parallel data to the host computer.

19. A parallel data transfer system of claim 18, wherein the control means includes selecting means for alternately selecting one of the first and second buffers as a buffer, into which the writing means writes the parallel data and for alternately selecting one of the first and second buffers as a buffer, from which the transferring means retrieves the parallel data.

20. An electronic device for transferring parallel data to a host computer, the device comprising:

storage means for storing parallel data for being transferred to the host computer;

reception means for receiving a host busy signal from the host computer;

first and second buffers for temporarily storing parallel data read out from the storage means;

writing means for reading out parallel data from the storage means and for writing the read out parallel data to either one of the first and second buffers; and transferring means for retrieving parallel data from either one of the first and second buffers and transferring the retrieved parallel data to the host computer at both timings when the host busy signal switches from the low level to the high level and when the host busy signal switches from the high level to the level.

21. An electronic device of claim 20, further comprising control means for controlling the writing means to write the parallel data read out from the storage means into one of the first and second buffers while controlling the transferring means to retrieve the parallel data from the other one of the first and second buffers and transfer the parallel data to the host computer at both timings when the host busy signal switches from the low level to the high level and when the host busy signal switches from the high level to the low level.

22. An electronic device of claim 21, wherein the control means includes selecting means for alternately selecting one of the first and second buffers as a buffer, into which the writing means writes the parallel data and for alternately selecting one of the first and second buffers as a buffer, from which the transferring means retrieves the parallel data.

23. An electronic device for transferring data in parallel to a host computer, the device comprising:

storage means for storing data for being transferred to a host computer;

reception means for receiving a host busy signal;

first and second buffers for temporarily storing data read out from the storage means;

writing means for reading out data from the storage means and for writing the read out data to the first and second buffers in alternation; and transferring means for retrieving data from the first and second buffers in alternation and transferring the retrieved data in parallel to the host computer, the transferring means performing its retrieving and transferring operation at both timings when the host busy signal switches from the low level to the high level and when the host busy signal switches from the high level to the low level.

* * * * *